US012568266B2

(12) United States Patent
Schweinfurth et al.

(10) Patent No.: US 12,568,266 B2
(45) Date of Patent: *Mar. 3, 2026

(54) MEDIA CONTENT DISTRIBUTION PLATFORM

(71) Applicant: WALGREEN CO., Deerfield, IL (US)

(72) Inventors: Andrew David Schweinfurth, Chicago, IL (US); Julija Alegra Petkus, Oak Park, IL (US)

(73) Assignee: WALGREEN CO., Deerfield, IL (US)

( * ) Notice: Subject to any disclaimer, the term of this patent is extended or adjusted under 35 U.S.C. 154(b) by 104 days.

This patent is subject to a terminal disclaimer.

(21) Appl. No.: 18/666,086

(22) Filed: May 16, 2024

(65) Prior Publication Data

US 2024/0305851 A1     Sep. 12, 2024

Related U.S. Application Data

(63) Continuation of application No. 17/846,579, filed on Jun. 22, 2022, now Pat. No. 11,997,342, which is a continuation of application No. 16/514,221, filed on Jul. 17, 2019, now Pat. No. 11,388,467.

(51) Int. Cl.
| | |
|---|---|
| *H04N 21/414* | (2011.01) |
| *H04N 21/214* | (2011.01) |
| *H04N 21/235* | (2011.01) |
| *H04N 21/2668* | (2011.01) |
| *H04N 21/422* | (2011.01) |
| *H04N 21/472* | (2011.01) |
| *H04N 21/475* | (2011.01) |

(52) U.S. Cl.
CPC ... *H04N 21/41415* (2013.01); *H04N 21/2143* (2013.01); *H04N 21/2353* (2013.01); *H04N 21/2668* (2013.01); *H04N 21/42203* (2013.01); *H04N 21/472* (2013.01); *H04N 21/4756* (2013.01)

(58) Field of Classification Search
None
See application file for complete search history.

(56) References Cited

U.S. PATENT DOCUMENTS

| | | | |
|---|---|---|---|
| 5,991,306 | A | 11/1999 | Burns et al. |
| 7,080,400 | B1 | 7/2006 | Navar |
| 7,404,201 | B2 | 7/2008 | Takeuchi et al. |
| 9,449,254 | B1 | 9/2016 | Antipa et al. |
| 9,892,424 | B2 | 2/2018 | Abraham et al. |
| 10,412,450 | B1 | 9/2019 | Savarkar et al. |
| 10,423,999 | B1 | 9/2019 | Doctor et al. |

(Continued)

*Primary Examiner* — An Son P Huynh
(74) *Attorney, Agent, or Firm* — MARSHALL, GERSTEIN & BORUN LLP

(57) ABSTRACT
Methods and systems may provide media content via retail display devices and/or portable electronic devices to assist consumers in retail environments. Potentially relevant media content may be intelligently obtained, stored, and/or distributed based on a number of considerations to ensure that relevant content will be available for a variety of consumers having a variety of retail needs. Through specific techniques described herein, the methods and systems herein may overcome technological and logistical challenges associated with distributing content among computing devices that are often limited in computing capabilities. Furthermore, the methods and system herein may provide media content in a manner that promotes authors who create and share media content via social media services.

24 Claims, 9 Drawing Sheets

(56) References Cited

U.S. PATENT DOCUMENTS

| | | |
|---|---|---|
| 10,440,436 B1 | 10/2019 | Taylor et al. |
| 10,692,043 B1 | 6/2020 | Woodyard et al. |
| 10,757,109 B2 | 8/2020 | Thomas |
| 10,810,540 B1 | 10/2020 | Gopal et al. |
| 10,817,839 B1 | 10/2020 | Clem |
| 10,904,617 B1 | 1/2021 | Labarre et al. |
| 11,018,939 B1 | 5/2021 | Harris |
| 11,336,928 B1 | 5/2022 | Thornberry et al. |
| 2002/0078174 A1 | 6/2002 | Sim et al. |
| 2002/0133491 A1 | 9/2002 | Sim et al. |
| 2003/0204856 A1 | 10/2003 | Buxton |
| 2004/0138948 A1 | 7/2004 | Loomis |
| 2007/0192166 A1 | 8/2007 | Van Luchene |
| 2007/0244750 A1 | 10/2007 | Grannan et al. |
| 2007/0261088 A1 | 11/2007 | Phillips et al. |
| 2008/0146342 A1 | 6/2008 | Harvey et al. |
| 2009/0089840 A1 | 4/2009 | Shusman |
| 2010/0070376 A1 | 3/2010 | Proud et al. |
| 2010/0190481 A1 | 7/2010 | Nath et al. |
| 2011/0069178 A1 | 3/2011 | Harris |
| 2011/0069940 A1 | 3/2011 | Shimy et al. |
| 2011/0078717 A1 | 3/2011 | Drummond et al. |
| 2011/0283322 A1 | 11/2011 | Hamano |
| 2012/0137336 A1 | 5/2012 | Applegate et al. |
| 2012/0289147 A1 | 11/2012 | Raleigh et al. |
| 2012/0319825 A1 | 12/2012 | Shimy et al. |
| 2013/0080578 A1 | 3/2013 | Murad et al. |
| 2013/0081311 A1 | 4/2013 | Luo et al. |
| 2013/0173765 A1 | 7/2013 | Korbecki |
| 2013/0293581 A1 | 11/2013 | Wissner-Gross et al. |
| 2014/0068692 A1 | 3/2014 | Archibong et al. |
| 2014/0081954 A1 | 3/2014 | Elizarov |
| 2014/0282750 A1 | 9/2014 | Civiletto |
| 2014/0363059 A1 | 12/2014 | Hurewitz |
| 2015/0030157 A1 | 1/2015 | Segev et al. |
| 2015/0127844 A1 | 5/2015 | Phillips et al. |
| 2015/0161671 A1 | 6/2015 | Watkeys |
| 2015/0201306 A1 | 7/2015 | Kazemi et al. |
| 2016/0006981 A1 | 1/2016 | Bauman et al. |
| 2016/0021412 A1 | 1/2016 | Zito, Jr. |
| 2016/0055503 A1 | 2/2016 | Chan |
| 2016/0057460 A1 | 2/2016 | Hao et al. |
| 2016/0191664 A1 | 6/2016 | Balakrishnan et al. |
| 2016/0366464 A1 | 12/2016 | Rouady et al. |
| 2016/0381427 A1 | 12/2016 | Taylor et al. |
| 2017/0053330 A1 | 2/2017 | Smith et al. |
| 2017/0078760 A1 | 3/2017 | Christoph et al. |
| 2017/0083862 A1 | 3/2017 | Loubriel |
| 2017/0091850 A1 | 3/2017 | Alvarez et al. |
| 2017/0127104 A1 | 5/2017 | Thomas et al. |
| 2017/0228804 A1 | 8/2017 | Soni et al. |
| 2017/0255900 A1 | 9/2017 | High et al. |
| 2018/0270534 A1 | 9/2018 | Badawiyeh |
| 2019/0034944 A1 | 1/2019 | Rorrison et al. |
| 2019/0075359 A1 | 3/2019 | Boss et al. |
| 2019/0141085 A1 | 5/2019 | Tsaplin et al. |
| 2019/0253743 A1 | 8/2019 | Tanaka et al. |
| 2019/0261027 A1 | 8/2019 | Hawke |
| 2019/0287063 A1 | 9/2019 | Skaaksrud et al. |
| 2019/0347606 A1 | 11/2019 | Malecha et al. |
| 2019/0349380 A1 | 11/2019 | Thomas |
| 2020/0364641 A1 | 11/2020 | Luedke et al. |

300

400

500

| | |
|---|---|
| OBTAIN MEDIA CONTENT | 522 |
| OBTAIN REQUEST FOR DISPLAY OF MEDIA CONTENT | 524 |
| SELECT MEDIA CONTENT FOR DISPLAY | 526 |
| CAUSE DISPLAY OF SELECTED MEDIA CONTENT | 528 |

600

| | |
|---|---|
| DETECT CONCLUSION OF DISPLAY | 622 |
| OFFER/RECEIVE CONSUMER FEEDBACK | 624 |
| RECORD CONSUMER FEEDBACK | 626 |
| MODIFY MEDIA METADATA AND/OR DISTRIBUTION | 628 |

MEDIA CONTENT DISTRIBUTION PLATFORM

CROSS-REFERENCE TO RELATED APPLICATIONS

This application claims priority to, and the benefit of the filing date of, U.S. patent application Ser. No. 17/846,579, filed Jun. 22, 2022, and entitled "MEDIA CONTENT DIS-TRIBUTION PLATFORM," which in turn claims priority to and the benefit of the filing date of, U.S. patent application Ser. No. 16/514,221, filed Jul. 17, 2019 and entitled "MEDIA CONTENT DISTRIBUTION PLATFORM. The entirety of the disclosures of each of the foregoing is hereby incorporated by reference herein.

FIELD OF THE DISCLOSURE

The present disclosure generally relates to distribution and display of video and other media content, and more specifically to techniques for intelligently distributing media content for provision to consumers in retail environments.

BACKGROUND

Consumers shopping in retail environments such as phar-macies, general stores, etc., may find difficulties choosing from a number of retail products for any particular shopping need. Particular, consumers shopping for beauty products (e.g., hair care, skin care, makeup, and fragrance products) might find any number of different products from any number of manufacturers or brands. Beyond just considering manufacturers and brands, consumers might also consider other factors such as the ingredients of products, or whether products are compatible with the user's skin tone, skin sensitivity, hair color, etc. Furthermore, even upon making a well-informed choice of product, consumers might find difficulties using beauty products, as any two beauty prod-ucts may be applied in different ways.

Popularization of social media has offered opportunities to alleviate some of these problems by educating consumers. In particular, many social media users have built popularity by creating, uploading, and distributing educational videos or other media content, for example via social media plat-forms such as YouTube™, Vimeo™ Facebook™, Twitter™, and Instagram™. Educational videos may, for example, advise consumers who are looking to choose a particular beauty product from among a plurality of choices, or instruct consumers as to how to best use particular beauty products.

SUMMARY

The present disclosure relates to a media content distri-bution platform that may intelligently obtain media content, distribute media content, and/or display media content via display devices in retail environments and/or portable elec-tronic devices carried by consumers. More particularly, the media content distribution platform described herein may overcome a number of technical and logistical challenges of obtaining, distributing, and displaying media content. For example, the platform as described herein may mitigate or overcome challenges relating to the limited storage and transmission capabilities of retail display devices, while still providing relevant, informative, and timely media content to consumers. The platform described herein may thereby improve consumer retail experiences, promote sales of retail products, and promote content creators or owners from which the media content may be sourced.

In one embodiment, a computing system may be pro-vided. The computing system may include one or more processors, and one or more memories storing non-transi-tory computer-executable instructions that, when executed via the one or more processors, cause the computing system to (1) obtain media metadata defining a plurality of media content offerings, the metadata respectively defining each respective media content offering from among the plurality of media content offerings to be associated with at least one product, (2) obtain location information for a plurality of locations, the location information for each respective loca-tion from among the plurality of locations indicating (i) a plurality of products located in the respective location, and (ii) respective locations and storage capacities of one or more display devices located in the respective location, (3) obtain an indication of a minimum or maximum content limit defining a minimum or maximum number of media content offerings or a minimum or maximum total size of media content offerings having a same metadata parameter value, the same metadata parameter value being one of (i) an associated product, (ii) a topic, (iii) a content author, (iv) a content owner, or (v) a language, (4) for each respective location, select, from the plurality of media content offerings based upon the minimum or maximum content limit and the media metadata, a respective subset of the plurality of media content offerings, such that the selected respective subset of media content offerings satisfies the minimum or maximum content limit with respect to each respective location, and/or (5) for each respective location, cause the selected respective subset of media content offerings to be transmitted to at least one computing device associated with the respective loca-tion. The system may include additional, fewer, or alternate components, and/or may perform additional, fewer, or alter-nate actions, as described herein.

In another embodiment, a computer-implemented method is provided, the method being performed via one or more processors. The method may include (1) obtaining media metadata defining a plurality of media content offerings, the metadata respectively defining each respective media con-tent offering from among the plurality of media content offerings to be associated with at least one product, (2) obtaining location information for a plurality of locations, the location information for each respective location from among the plurality of locations indicating (i) a plurality of products located in the respective location, and (ii) respec-tive locations and storage capacities of one or more display devices located in the respective location, (3) obtaining an indication of a minimum or maximum content limit defining a minimum or maximum number of media content offerings or a minimum or maximum total size of media content offerings having a same metadata parameter value, the same metadata parameter value being one of (i) an associated product, (ii) a topic, (iii) a content author, (iv) a content owner, or (v) a language, (4) for each respective location, selecting, from the plurality of media content offerings based upon the minimum or maximum content limit and the media metadata, a respective subset of the plurality of media content offerings, such that the selected respective subset of media content offerings satisfies the minimum or maximum content limit with respect to each respective location, and/or (5) for each respective location, causing the selected respec-tive subset of media content offerings to be transmitted to at least one computing device associated with the respective location. The method may include additional, fewer, and/or alternate actions, including actions described herein.

In yet another embodiment, one or more computer readable media are provided. The one or more computer readable media may store non-transitory, computer executable instructions that, when executed via one or more processors, cause one or more computers to (1) obtain media metadata defining a plurality of media content offerings, the metadata respectively defining each respective media content offering from among the plurality of media content offerings to be associated with at least one product, (2) obtain location information for a plurality of locations, the location information for each respective location from among the plurality of locations indicating (i) a plurality of products located in the respective location, and (ii) respective locations and storage capacities of one or more display devices located in the respective location, (3) obtain an indication of a minimum or maximum content limit defining a minimum or maximum number of media content offerings or a minimum or maximum total size of media content offerings having a same metadata parameter value, the same metadata parameter value being one of (i) an associated product, (ii) a topic, (iii) a content author, (iv) a content owner, or (v) a language, (4) for each respective location, select, from the plurality of media content offerings based upon the minimum or maximum content limit and the media metadata, a respective subset of the plurality of media content offerings, such that the selected respective subset of media content offerings satisfies the minimum or maximum content limit with respect to each respective location, and/or (5) for each respective location, cause the selected respective subset of media content offerings to be transmitted to at least one computing device associated with the respective location. The one or more computer readable media may store additional, fewer, and/or alternate instructions, in various embodiments, including instructions described herein.

BRIEF DESCRIPTION OF THE DRAWINGS

The figures described below depict various embodiments of the system and methods disclosed herein. It should be understood that each figure depicts an embodiment of a particular embodiment of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

There are shown in the drawings arrangements which are presently discussed, it being understood, however, that the present embodiments are not limited to the precise arrangements and instrumentalities shown, wherein.

Figure 1:
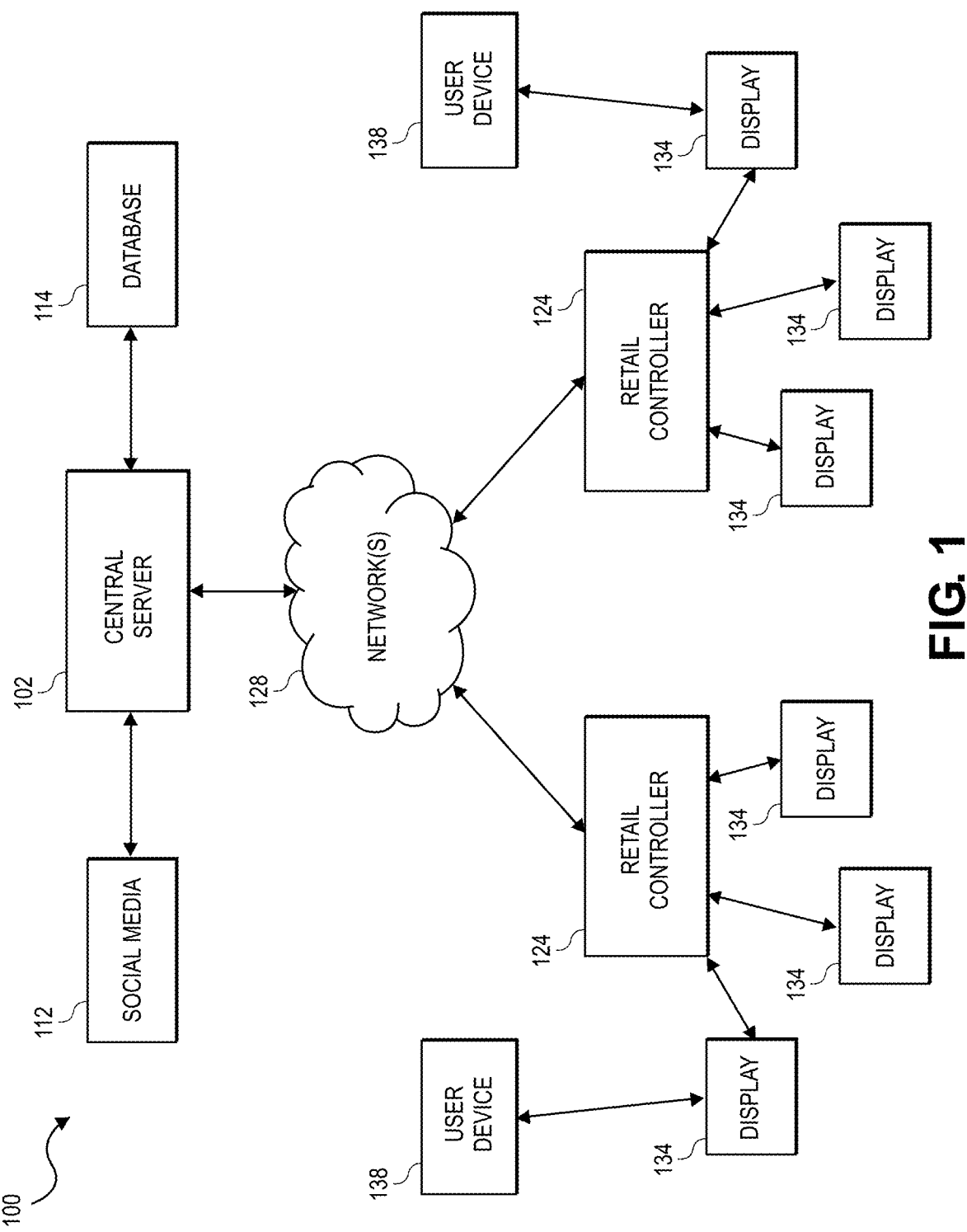
FIG. 1 depicts an example computing environment associated with a media content distribution platform, in accordance with some embodiments.

The Figures depict embodiments for purposes of illustration only. One skilled in the art will readily recognize from the following discussion that alternative embodiments of the systems and methods illustrated herein may be employed without departing from the principles of the invention described herein.

DETAILED DESCRIPTION

The present disclosure relates, inter alia, to a media content distribution platform that may intelligently obtain and store media content, distribute media content among a number of computing devices, and cause media content to be displayed to consumers in retail environments.

Via techniques described herein, the media content distribution platform may mitigate or overcome technical challenges of distributing media content. For example, the platform as described herein may at least mitigate challenges relating to the limited storage and transmission capabilities of retail display devices, while still providing relevant, informative, and timely media content to consumers.

At a high level, media content, such as video content (and/or audio), may be obtained via social media services such as YouTube, Facebook, Instagram, etc., and/or from other sources. Obtained media content may include various "media metadata" describing the media itself (e.g., title, description, author, length, ratings, etc.). Various other information may also be obtained, such information including, for example information indicating (1) physical arrangements of products, aisles, display devices, etc., in retail environments, (2) purchase records or preferences of consumers, and/or (3) computing capabilities of servers, controllers, and/or display devices utilized by the media content distribution platform. Based on media metadata and other information provided herein, particular media content ("media content offerings") may be intelligently distributed from a central source to computing devices ("controllers") each individually tasked with distributing the media content in a respective retail environment (e.g., a particular pharmacy or general store). Accordingly, each controller may, in turn, intelligently distribute media content to a number of display devices located in particular areas of the retail environment.

The display devices in the retail environment may provide received media content to consumers upon requests for media content. More particularly, each display device may utilize intelligent techniques select, from media content offerings stored at the display device, a particular media content offering most appropriate for the consumer(s) based on the request and various other contextual information.

Media playback metrics and consumer feedback may be recorded and distributed. Via these techniques, media content offerings identified as well-reviewed may be identified such that subsequent provision of media content to consumers may be improved. Additionally, the media playback metrics may allow for calculation of any necessary compensation or charges to be issued to media content authors and/or owners.

Although this detailed description will describe distribution and display of media content amongst retail environments, it should be understood that implementation in other fields may be envisioned. That is, the media content distribution platform may be implemented in various fields in which media content is to be provided via a distributed network of servers, controllers, and/or display devices. For example, the media content distribution platform may be implemented to provide media content via display devices in museums, stadiums, cafeterias, and/or other environments.

It should be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

I. EXAMPLE COMPUTING ENVIRONMENT

FIG. 1 illustrates an example computing environment 100 associated with a media content distribution platform. At a high level, the environment 100 comprises a plurality of computing entities configured to collectively obtain media content, distribute the media content, and/or cause the media content to be displayed in retail environments such as pharmacies, general stores, and the like. Further technical detail regarding the computing entities depicted in FIG. 1 will be provided herein, particularly with respect to FIGS. 7-9. It should be appreciated that the environment 100 may include additional, fewer, and/or alternate computing entities, and may be configured to perform additional, fewer, and/or alternate actions to those descried herein.

The environment 100 may include a central server 102 (i.e., one or more servers), which may be configured to obtain, store, analyze, and/or distribute media content to and from a variety of sources and/or destinations. The central server 102 may obtain media content, for example, via one or more social media services 112 (e.g., YouTube, Vimeo, Facebook, Instagram, etc.), and/or via one or more other external databases 114. The central server 102 may obtain the media content via a network 128 (i.e., one or more networks). The central server 102 may analyze the obtained media content to determine various metadata parameter values corresponding to respective media content offerings, and the central server 102 may store the media content and the corresponding metadata parameter values via one or more databases.

The central server 102 may selectively distribute media content to one or more retail controllers 124 via a network 128 (i.e., one or more networks). The network 128 may facilitate any type of data communication via any standard or technology (e.g., GSM, CDMA, TDMA, WCDMA, LTE, EDGE, OFDM, GPRS, EV-DO, UWB, IEEE 802 including Ethernet, WiMAX, WiFi, Bluetooth, and others, including combinations thereof). It should be understood that any bidirectional arrows depicted connecting any two or more computing entities of the computing environment 100 may represent communicative connections via the network 128.

Each of the retail controllers 124 may be located in a respective retail environment, or may be otherwise communicatively connected to computing entities in the respective retail environment. Each retail controller 124 may receive and store media content provided via the central controller 102, the received and stored media content offerings including corresponding metadata parameter values.

Each retail controller 124 may selectively provide media content, including media metadata, to each of one or more retail display devices 134. Each of the retail display devices 134 may be associated with a particular physical area of the retail environment in which the display device 134 is located (e.g., a particular aisle of a pharmacy offering a particular subset of beauty products). Accordingly, each display device 134 may be associated with a particular set of retail products, such as beauty products, personal hygiene products, medical products, etc., that are located near the display device 134 (e.g., on a same shelving unit).

Each retail display device 134 may include one or more visual display device (e.g., LED or other display screen), and/or other input/output devices that may display media content and/or receive consumer interactions. The retail display devices 134 may receive media content via respective retail controllers 124 via the one or more networks 128.

The environment 100 may include one or more user devices 138 ("client devices") associated with consumers in respective retail environments. User devices 138 may, for example, include smartphones or other portable computing devices belonging to consumers in the retail environments. In some embodiments, user devices 138 may communicate with the retail display devices 134 and/or retail controllers 124 to exchange location information indicating the location of the consumer in a retail environment. According to various techniques described herein, a retail display device 134 may perform various actions responsive to location of a user device 138 and/or other communications from a user device 138.

In some implementations, the environment 100 may include one or more regional controllers placed communicatively between the central controller 102 and the one or more retail controllers 124. That is, one or more regional controllers may selectively obtain and store media content from the central controller 102 via the network 128, and each of the one or more regional controllers may in turn distribute media content to a respective one or more retail controllers 124 via the network 128 (e.g., to retail controllers 124 in a respective geographic region or other respective group), using similar techniques to those described herein.

As will be described in further detail, components of the computing environment 100 may have particular computing limitations that may limit the capability to receive, store, and/or transmit media content. For one, storage limitations of the central server 102 may limit the amount of media content that may be stored, and hence distributed, among the computing environment 100. Additionally, storage and transmission limitations of each individual retail controller 124 may limit the amount of media content that may be stored and/or transmitted to display devices. Still additionally, even more severe storage and limitations retail display devices 134 may limit the capability of the display devices 134 to receive and/or store media content. More particularly, any one individual display device 134 may have severely limited memory capacity, and/or may have a limited media throughput rate (e.g., a 1.5 Mb/s limit for media transmissions from retail controller 124) that limit the display device 134 to receiving and/or storing only a small amount of the media content obtained by its retail controller 124.

These and other computing limitations described herein present a need for intelligent or selective distribution and storage of media content among the central controller 102, retail controller(s) 124, retail display devices 134, and/or user devices 138. The distribution techniques described herein may provide numerous benefits, including (1) mitigating computing limitations of computing entities described herein (2) facilitating provision of relevant media content to consumers in a retail scenarios, (3) promoting authors and/or owners of the media content, and/or (4) improving product sales and consumer satisfaction in retail environments.

It should be noted that, in some embodiments, functions of computing entities of the environment 100 may be combined. For example, in some embodiments, one or more retail controllers 124 may perform at least some of the actions generally attributed to the central server 102 (or vice versa). Furthermore, while various computing components are depicted in FIG. 1 as being communicatively connected, other connections between the computing entities may be envisioned. For example, in some embodiments, two or more retail display devices 134 may be interconnected (e.g., via hardwired and/or wireless connection(s)). As another example, in some embodiments, one or more user devices 138 may be communicatively connected to one or more social media services 112 (e.g., via WiFi or GSM). Effectively, any of the computing entities of the computing environment 100 may be communicatively connected to any other of the computing entities of the computing environment 100 via the network 128.

II. OBTAINING AND STORING MEDIA CONTENT

Media content described herein may include media content offerings uploaded to social media platforms by social media content creators (e.g., to YouTube, Vimeo, Facebook, Twitter, and/or Instagram). Such media content may, for example, explain how to use a particular consumer product (e.g., how to properly apply a topical beauty product), provide review of a particular product or products, or otherwise provide advice for choosing between any two or more similar products (e.g., based on skin tone, skin sensitivity, allergenic ingredients, or environmental concerns).

Accordingly, media content described herein may be obtained via the social media service(s) 112, which may refer to databases and/or other computing entities via which such social media content may be obtained. In some embodiments, the central server 102 may subscribe to one or more social media channels or users. The central server 102 may, for example, automatically request and receive media content from the one or more social media services 112 at predetermined intervals such that up-to-date content is requested and received. In some embodiments, uploading of social media at a social media service 112 may cause an indication thereof to be transmitted to the central server 102, upon which the central server 102 automatically requests and receives media content. Additionally or alternatively to obtaining media content via the social media service(s) 112, the central server 102 may obtain media content via one or more other databases 114, via similar techniques.

As described herein, media content obtained, stored, and distributed by the central server 102 may include (1) the media itself, e.g., video and/or audio in any acceptable file format(s), and (2) media metadata, for example author, date of upload or creation, length, language, reviews/ratings, description, tags indicative of subject matter, and/or various other information, further examples of which will be provided herein. Such media metadata may be expressed, for example, in JSON, XML, AJAX, and/or another suitable data description format(s). The central server 102 may store media content via one or more relational databases, in some embodiments.

In some embodiments, the central server 102 may store media metadata using a canonical description format. Accordingly, in some embodiments, obtaining media content via the central server 102 may include converting corresponding media description data to a canonical description format to be stored and distributed via the central server 102. Moreover, in some embodiments, obtaining and storing media content may include automatically and/or manually generating further media metadata to be stored and distributed with the media content. Such generated metadata may include, consumer feedback provided after display of the media content in retail environments, purchase records subsequent to display of the media content, and/or time stamps more particularly identifying subject matter of particular portions of video content. In some embodiments, generated metadata may include metadata indicative of audio in the media content, or more particular, a level of importance of any audio in the media content. Whereas some media content originally including audio may be equally or almost equally satisfactory to consumers without audio (or with subtitles replacing audio), some content may not be so satisfactory without original audio. In some embodiments, distribution and/or display of media content may be based on a determination of whether audio is available (e.g., whether the display device can play audio, or whether the consumer will be able to hear the audio based on an ambient noise level of the environment in which the media content is to be displayed).

In some embodiments, additionally alternatively to storing the media itself, the central server 102 may store a reference (e.g., link) to the media. In these embodiments, distributing the media content to a retail controller 124 may include locating the media via the reference and directing the media content to be transmitted to the retail controller 124.

III. DISTRIBUTING MEDIA CONTENT

Still referring to FIG. 1, once media content has been obtained via the central server 102, said media content may be distributed among further computing entities of the environment 100.

Generally, said media content may be distributed via the network 128 to one or more retail controllers 124, each of which may comprise one or more computing devices (e.g., servers, memories, transceivers, etc.) configured to direct communications in a particular retail environment (e.g., a particular pharmacy, general store, etc.). Subsequently to being received at a retail controller 124, said media content may be distributed to one or more display devices 134 and/or user devices 138 to thereby allow for provision of said media content to consumers as consumers browse the retail environment.

As described above, implementation of the media content distribution platform described herein may be generally constrained by the limitations of computing entities of the computing environment 100, limited transmission and/or storage capabilities associated with the central server 102, retail controller(s) 124, and/or display devices 134. Implementation is also limited by practical considerations of envisioned use cases, which ask that media content be displayed in reasonable time, in many cases demanding substantially immediate display of the content responsive to a request.

To provide further detail by way of an example scenario, a consumer may shop for hair care products in a particular aisle of a pharmacy. At some point while the consumer is in the aisle, some explicit or implicit request for media content may be received via a display device 134 located in the aisle. The nature of this scenario may require that a media content offering be selected and displayed substantially immediately upon the request, such that the consumer has not left the aisle or otherwise become disinterested before the media content can be displayed. In light of this demand, provision of such media content responsive to the request may require either (1) streaming the media content from some other computing device (e.g., from the retail controller 124 or central server 102), or (2) already having obtained suitable media content at the display device 134, such that the media content may be obtained from local storage and displayed.

Of these two approaches, the first approach may be unfeasible or entirely impracticable given the existing computing limitations. For example, due to limited transmission speeds between the retail controller 124 and any one particular display device 134 (e.g., 1.5 Mb/s), live streaming may require substantial loss in size and/or quality of the media content, or may be impossible altogether. Moreover, scalability presents concerns in retail environments that include a plurality of display devices 134. In such environments, multiple simultaneous transmissions between a retail controller 124 and display devices 134 may not be possible.

The second approach, in which the display device 134 has already received the media content, is attractive but is still limited by the limited storage and transmission capabilities of display devices 134. The media content distribution platform described herein may mitigate or resolve at least these technical challenges by (1) anticipating that particular media content offerings may be suitable for transmission and storage at retail controllers 124 and/or display devices 134, and (2) accordingly distributing the media content offerings to retail controllers 124 and/or display devices 134 to anticipate scenarios in which the media content offerings will be beneficial.

Thus, various media content distribution, storage, and display techniques are proposed. In various embodiments, suitable combinations of the described techniques may be utilized.

In some embodiments, retail controllers 124 may store and update information associated with their corresponding retail environments. Such information may include, for example, (1) a current listing of products sold in the particular retail environment, (2) retail purchase records, indicating popularity of certain products among consumers, (3) product pricing or marketing information, indicating prices and/or promotions of products, (4) a physical arrangement or "layout" of the retail environment, e.g., mapping locations of aisles, products, check-out lanes, and/or other areas of the retail environment, (5) region, language, and/or other demographic information associated with the retail environment and consumers shopping therein, and/or (6) consumer feedback and/or media display metrics associated with previous display of media content in the retail environment (e.g., total plays at display devices, total length of media played, retention rate, etc.).

Still additionally or alternatively, any retail controllers 124 may store information associated corresponding display devices 134, such information including for example, (1) locations of the display devices 134 (e.g., in relation to particular products), (2) computing capabilities of display devices (e.g., transmission capabilities, total storage, available storage, and/or display resolution), and/or (3) a current listing of media content offerings stored at display devices 134.

In some embodiments, any of the above information, with respect to each of the retail controllers 124, may additionally or alternatively be received and/or stored at the central server 102. The central server 102 may additionally or alternatively store further information associated with retail controllers 124, such as (1) regions/languages associated with retail controllers 124, (2) computing capabilities of retail controllers 124, and/or (3) listings of media content offerings currently stored at respective retail controllers 124 and/or their corresponding display devices 134.

In various embodiments, the media content distribution platform described herein may obtain, store, and/or distribute media content based on any of the information described above. Some exemplary embodiments are provided below.

In some embodiments, media content may be distributed to display devices based on identification of the retail products offered at or near those display devices. The central server 102 may, for example, obtain listings of products offered at each of one or more retail environments, or more specifically obtain information identifying particular products to be promoted (e.g., sales, product launches, etc.). Accordingly, the central server 102 may obtain media content relating to those products, and may intelligently distribute the media content to retail controllers 124 in which the particular products are offered (e.g., based on comparison of the product listings to corresponding media metadata). The central server 102 may also specifically distribute media content in a language associated with particular retail environments (e.g., based on languages most commonly spoken by consumers at each retail environment).

Subsequent to receiving the media content, retail controllers may identify display devices to which at least portions of the media content should be transmitted. Each respective retail controller 124 may, for example, distribute at least a portion of the media content to each of one or more display devices 134 based on locations of products in the retail environment with respect to the one or more display devices 134 (e.g., products in a same aisle or within a predetermined distance of each display device 134). In some embodiments, a retail controller 124 may transmit media content to display device 134 based on computing capabilities of the display device 134. For example, where a particular display device 134 does not have audio output capabilities, or is located in a particularly noisy area of a retail environment, the retail controller 124 may provide media content excluding audio, and/or provide media content that is not substantially reliant on an audio component.

In some embodiments, to manage memory at receiving devices, time limits may be imposed upon how long distributed content remains at a particular destination. For example, the retail controller 124 may provide, with a transmission of media content to a display device, an indication of a time-to-live at the display device 134, upon expiration of which the display device 134 is instructed to automatically delete the received media content (e.g., 48 hours). In some embodiments, a display device 134 may periodically query its retail controller 124 to obtain product listings/arrangements, and may responsively delete media content upon determining that the media content may no longer be relevant to the display device 134 (e.g., when the display device 134 is no longer located near a particular product to which a stored media content offering primarily pertains).

In some embodiments, retail controllers may mitigate limited network capacity by intelligently scheduling transmissions of media content to display devices. For example, when a retail controller 124 determines that media content is to be provided to a plurality of display devices 134, the retail controller may schedule transmissions to occur at times in which available network bandwidth may be maximized (e.g., overnight transmissions, and/or such that the retail controller 124 transmits to only one display device 134 at a time).

In some embodiments, minimum or maximum limits may be imposed upon the distributed media content. For example, in some embodiments, a retail controller 124 may receive at least minimum amounts of media content directed to each of a plurality of products sold in the corresponding retail environment (e.g., minimum quantities of data, or minimum number of unique media content offerings). Additionally or alternatively, each display device 134 may obtain and store, via its retail controller 124, at least minimum amounts of media content directed to each of a plurality of products in its corresponding physical area of the retail environment (e.g., minimum quantities of data in raw size or in relation to total storage capabilities of the display, or minimum number of unique media content offerings). Still additionally or alternatively, a retail controller 124 and/or a display device 134 may only store up to a particular amount of media content directed to any one particular product (e.g., in terms of quantity of data, number of unique data offerings, or quantity of data with respect to total storage capability).

Further to minimum/maximum limits imposed on media content corresponding to particular products, minimum/maximum limits may be imposed based on other characteristics of the distributed media content. For example, any particular retail controller 124 or display device 134 store a minimum and/or maximum amount of media content associated any one particular social media content creator, a particular language, a particular topic, or other metadata parameter value. Via these minimum/maximum limits, variety among distributed media content may be ensured, so as to allow for relevant media content to be provided to consumers in a variety of retail scenarios.

At display devices and retail controllers, various factors may be considered to determine, from among a plurality of media content (e.g., from among a plurality of videos and/or other media), precisely which media content should be obtained and/or displayed. In some embodiments, display devices 134 and/or retail controllers 124 may request media content, the requests comprising metadata parameter values describing requested content (e.g., requesting content directed to particular products, having a particular size, a particular language, etc.). Accordingly, upon receiving a content request, the request may be compared to a plurality of available media content offerings, and one or more media content offerings most closely matching the request may be provided to the requesting device. In some embodiments, such selection of media content may be further based on weighting factors associated with one or more media content offerings. In some scenarios, for example, additional weight may be placed upon media content pertaining to a particular promoted product, or pertaining to a particular promoted retail product, causing particular media content offerings to be more likely to distributed.

In some embodiments, a request for media content may further include an indication of one or more media content offerings already stored at the requesting device. Additionally or alternatively, such information may be distributed among computing entities prior to content requests.

Via the media content distribution techniques described herein, media content may be intelligently distributed such that retail controllers and displays make more efficient the use of limited memory and network transmission capabilities, and such that relevant content may be provided to consumers in particular retail scenarios.

IV. DISPLAYING MEDIA CONTENT

Figure 2A:
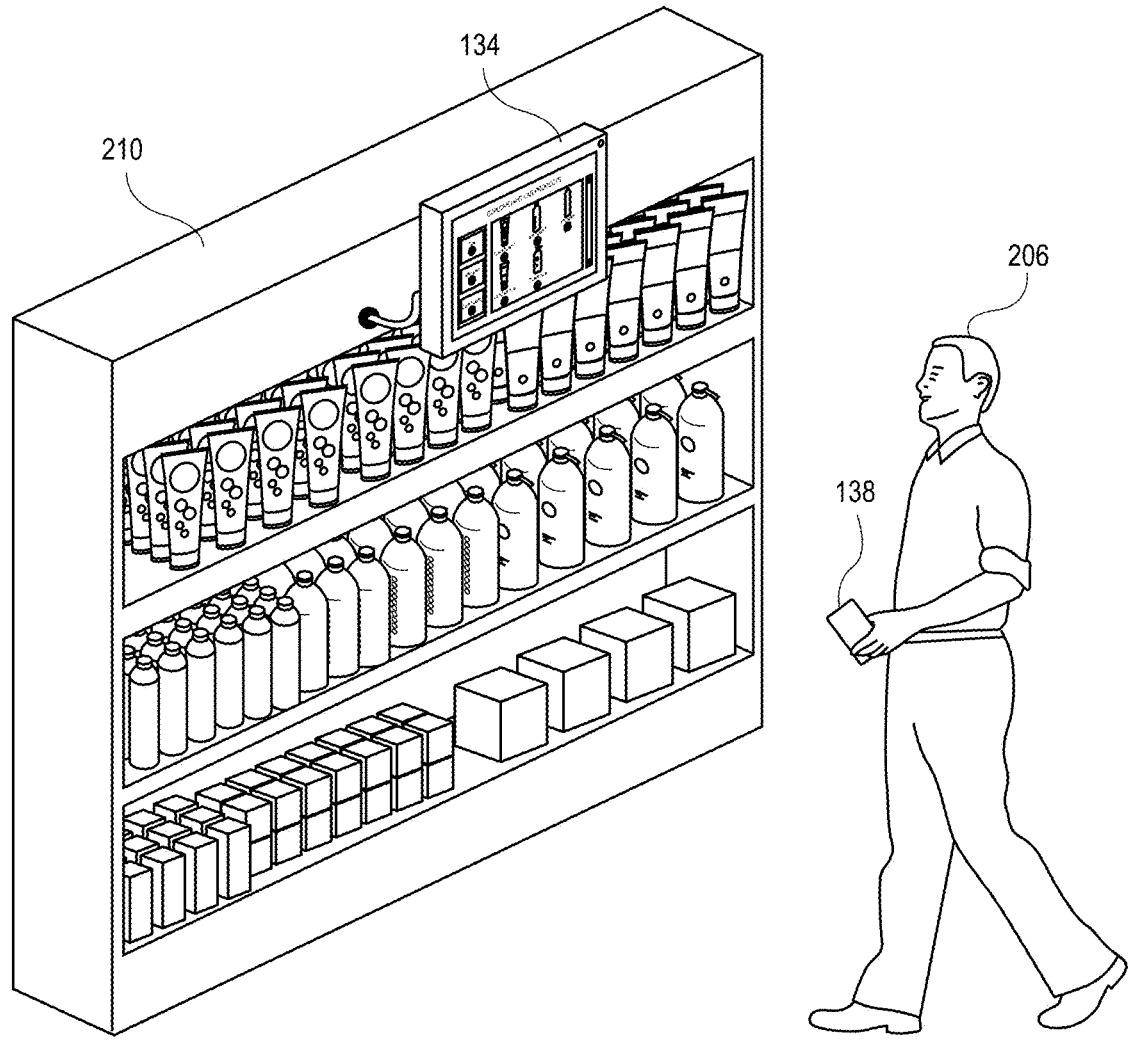
FIG. 2A depicts an example scenario in which techniques described herein may be applied, in accordance with some embodiments.

FIG. 2A depicts an example scenario in which media content may be displayed to a consumer in a retail environment.

Particularly, a consumer 206 in possession of a user device 138 (e.g., a smartphone, tablet, etc.) is shown approaching a product display shelf 210, which has retail products such as an assortment of beauty products stored thereupon. A retail display device 134 is mounted to the display shelf 210, and may be communicatively connected to a retail controller (not depicted) via one or more communicative connections (e.g., a wireless connection and/or a wired connection through the display shelf 210). The display device 134 may have access to a plurality of media content offerings obtained via the distribution techniques stored herein (e.g., via intelligent distribution and storage, and/or in some embodiments wherein network bandwidth/transmission capabilities meets a required threshold, via streaming).

Generally. provision of media content via the display device 134 may include at least (1) obtaining some indication that media content should be displayed to the consumer 206, (2) obtaining further contextual information that may inform a selection of what media content is to be displayed, (3) selecting the media content that is to be displayed, and/or (4) displaying the selected media content to the consumer 206.

Various techniques may be used to provide an indication that media content should displayed. In some embodiments, the consumer 206 may physically approach the display device 134 and provide an explicit or implicit request for media content, for example by a voice command, selection of a "play" button, and/or other user interaction at the display device 134. In some embodiments, the user device 138 may store a consumer application, such as a proprietary pharmacy application, that enables the user device 138 to communicate with the display device 134. The consumer 206 may, for example, utilize the consumer application to provide a request for media content, and the request may be transmitted to the display device 134 via one or more communicative connections (e.g., WiFi, GSM, or NFC). In some embodiments, the consumer application may be permitted to automatically locate via communication with the display device 134, retail controller, and/or other system, and may provide a request for media content upon a determination that the consumer 206 has been located near the same display device 134 for at least a predetermined length of time (e.g., 5 seconds, 30 seconds, or 60 seconds).

In various embodiments, further information may be obtained that may inform the selection of media content to be displayed (or the manner in which it should be displayed).

In some embodiments, consumer interaction with the display device 134 and/or user device 138 may more particularly include an indication of a particular product, content creator, topic, and/or language according to which the media content should be selected. For example, in response to determining that media content should be displayed (via any technique described herein), the display device 134 may provide a listing of products located at or near the display device 134, from which the consumer 206 may select a product about which media content is to be displayed. In some embodiments, user-specific product preferences may be obtained via the consumer application (e.g., skin tone, skin sensitivity, allergies, language, etc.). In some embodiments, the display 134 may further communicate with one or more other displays present nearby (not depicted) in the retail environment, to determine whether the other display devices are currently playing media that may be distracting to the consumer 206.

In any case, a selection may be made regarding what media content is to be displayed The selection of media content may be made, for example, at the display device 134 and/or another device based on (1) the media content offerings presently available at the display device 134 (e.g., stored media content, and (2) a comparison of any further parameter values to metadata corresponding to the available media content. In various embodiments, selection of media content to be displayed may be made based on other information available to the display device 134, e.g., product promotions, consumer preferences, and/or other information described herein.

In some embodiments, a most similar media content offering from among the available offerings may automatically be selected. In other embodiments, two or more similar media content offerings may be selected, and a choice may be displayed via an interface at the display device 134 to allow the consumer 206 to select one of the two or more media content offerings for display. In some embodiments, selecting media content to be displayed may include selecting a particular portion of a media content offering. For example, where one of the available media content offerings is a three-minute long video, the video may be selected to start from a particular timestamp at which the portion of the video may be particularly relevant to the consumer 206.

Figure 2B:
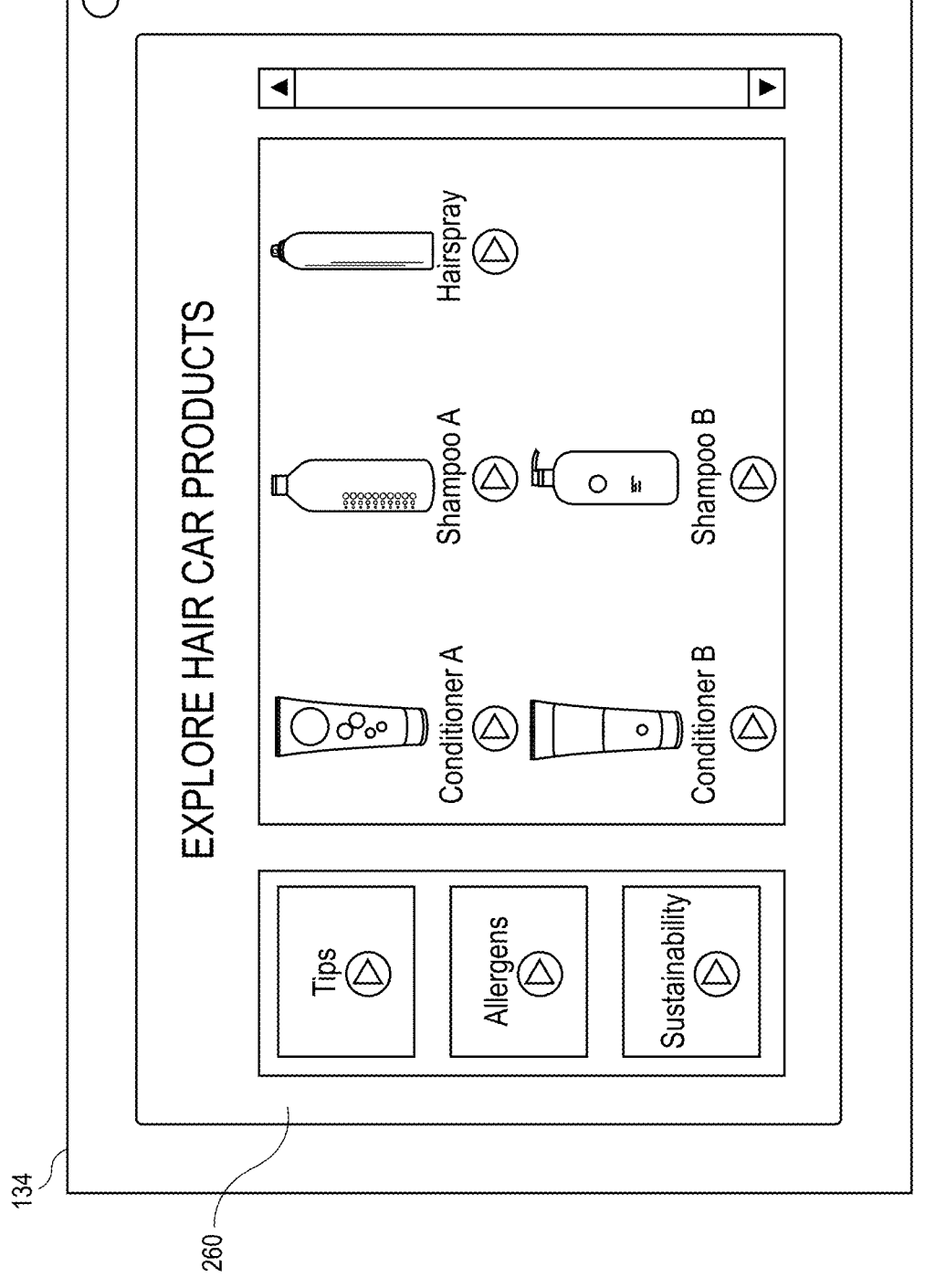
FIG. 2B depicts an example user interface which may be provided, for example, in the scenario depicted in FIG. 2A, in accordance with some embodiments.

In accordance with some of the concepts described above, FIG. 2B depicts an example user interface 260 via which a request for media content and other information may be received. In FIG. 2B, the interface 260 is shown as being displayed via the display device 134. However, it is envisioned that the interface 260 may be displayed via additional or alternative devices (e.g., the user device 138).

The example user interface 260 displays information relating to hair care products offered in a retail environment. The interface 260 includes first and second panels. The first panel displays particular categories or "topics" of media content that may be associated with hair care products. Such topics may include, for example, tips for the offered products, potential allergens in the offered products, and/or sustainability concerns relating to the offered products (e.g., packaging materials, ingredients, and/or other concerns relating to methods of manufacture of products). The second panel may display a listing of products available in the particular area of the retail environment in which the display device 134 is located. Requests for media content may, in various embodiments, include a selection from the user via the first and/or second panel(s) (e.g., a touchscreen selection). Such selections may cause a request for media content to include one or more parameter values based on the selection, which may be compared to media metadata to select a relevant media content offering. For example, selection of "Tips" in the first panel may return a media content offering general advice for use of hair care products (with or without focus on any one particular offered product). As another example, selection of "Shampoo A" may return a media content offering specifically relating to Shampoo A (if such media content is stored at the display device 134), a next most relevant media content offering if said product-specific content is not available.

In any case, upon determination of a media content offering to be displayed, the display device 134 may display the selected media content offering. Displaying the media content may include playing video and/or audio via the display device 134. Particularly, in some embodiments, if audio is to be played at the display device 134, audio may automatically be disabled at one or more other nearby display devices. In other embodiments, if audio is already playing at the one or more other nearby display devices, displaying the media content may exclude playing audio an audio component of the selected media content offering.

In some embodiments, displaying the selected media content may further include causing further content to be displayed via the user device 138. For example, when the selected media content corresponds to a particular consumer product, the consumer application at the user device 138 may automatically navigate to a webpage providing additional information regarding the particular consumer product, thereby-providing a dual-screen experience for the consumer 206.

V. CONSUMER INTERACTION AND FEEDBACK

Various functionalities may be provided to consumers to further control the display of media content. In some embodiments, the consumer 206 may one or more user controls to stop the display of media content at the display device 134 (e.g., voice command, touchscreen interaction with a "stop" touchscreen button, etc.). In some embodiments, the display device 134 may, upon conclusion of the video or a relevant portion thereof, cease display of the media content.

Upon conclusion of the display of the media content, the display device 134 may receive user feedback regarding the consumer's satisfaction with the displayed media content. The display device 134 may, for example, display an interface to receive a rating of the displayed media content itself, and/or a judgment of whether the consumer 206 was generally satisfied with the media content display experience (e.g., "yes" or "no"). The display device 134 may log and/or transmit the user feedback, along with an indication that the media content was indeed displayed at the display device 134.

Figure 2C:
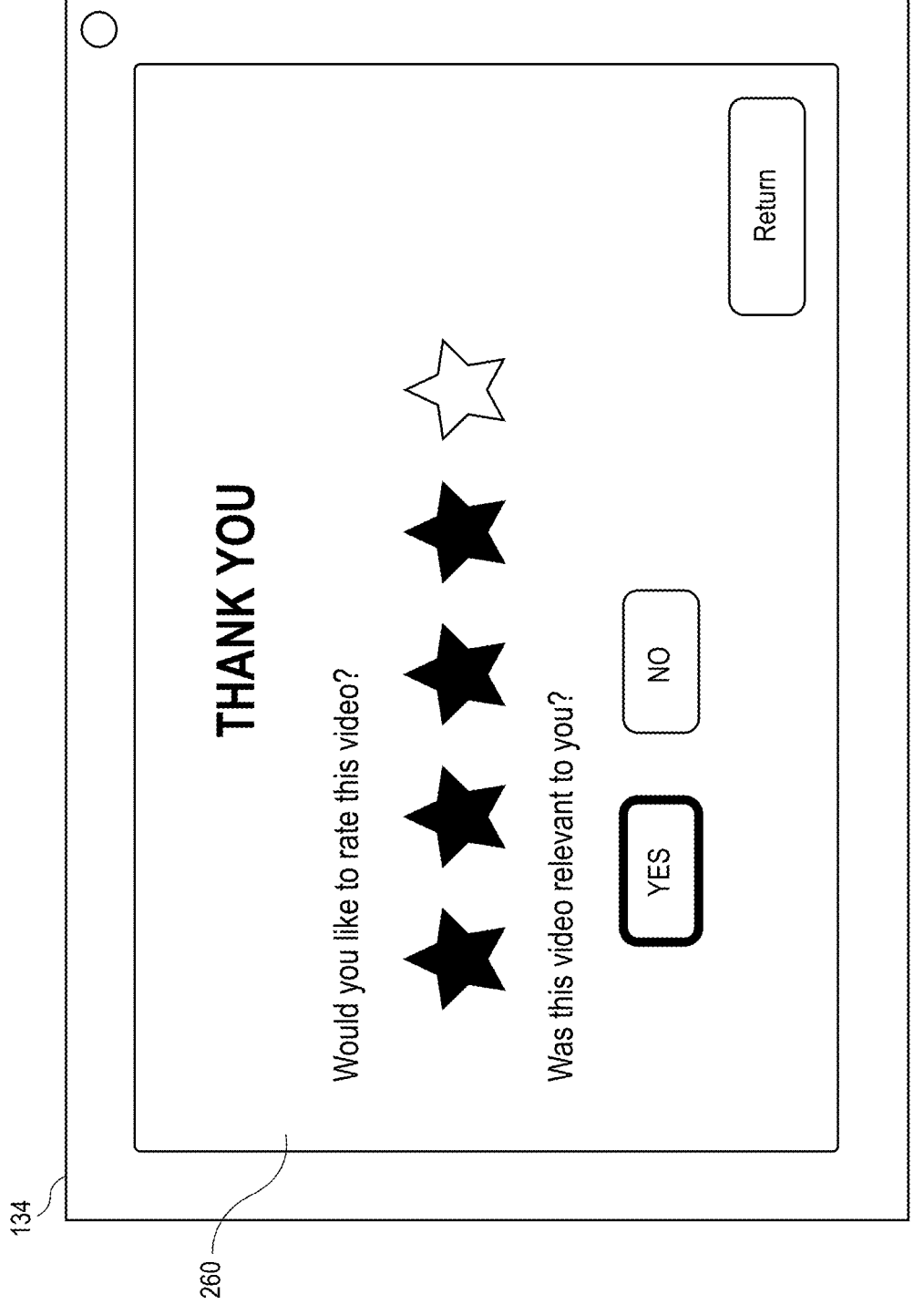
FIG. 2C depicts another example user interface which may be provided, for example, in the scenario depicted in FIG. 2A, in accordance with some embodiments.

In accordance with some of the concepts described herein, FIG. 2C depicts another aspect of the example user interface 260 via which consumer feedback may be received. In FIG. 2C, the interface 260 is shown as being displayed via the display device 134. However, it is envisioned that the interface 260 may be displayed via another device, in some embodiments (e.g., the user device 138). In any case, the interface 260 may enable a consumer to rate a displayed media content offering upon conclusion of the display (e.g., a 1-5 star rating). The interface 260 may also enable a consumer to provide an indication of whether the consumer felt the displayed media content was relevant to the consumer's interests or needs, thereby separating the question of quality of content distribution from the question of quality of the content itself. User interaction with the interface 260 may be received, for example, via touchscreen interactions with the display device 134, and/or other suitable input.

In various embodiments, media content display metrics, user feedback and/or retail purchase records may be utilized to determine effectiveness of particular media content offerings in promoting sales of a particular product and/or elevating user satisfaction. It may be determined, for example, that a particular media content offering, when displayed to consumers, receives higher average ratings and/or corresponds to increase in sales among consumers to whom the media content offering is provided.

In some embodiments, distribution of media content may be weighted based on the determinations of effectiveness of particular media content offerings. For example, when a media content offering is determined to be effective, the offering may be positively weighted such that it is more likely to be distributed to a larger number of retail controllers and/or display devices. Conversely, when a media content offering is determined to be less effective, the offering may be negatively weighted so as to be less likely to be distributed.

In some embodiments, similar media content offerings may be weighted based on effectiveness of a first media content offering. For example, when the first media content offering from a particular content creator is effective, positive weighting may be applied to further media content offerings from the same content creator, and/or to media content offerings that are otherwise similar to the first media content offering (e.g., based on comparison of metadata parameter values among media content offerings available at central/retail servers).

Feedback and display metrics may be stored at the display device, and/or distributed to retail controllers and/or central servers. Display metrics may include, for example, a number of occasions on which a particular media content offering was displayed, and/or a total length of time that the particular media content offering was displayed. According to some implementations, such display metrics may be used to calculate compensation or charges to be issued to social media content creators or other authors or owners of the displayed media content (e.g., on a per-display or per-minute-of-display basis).

VI. EXAMPLE COMPUTER-IMPLEMENTED MEDIA DISTRIBUTION METHODS

Figure 3:
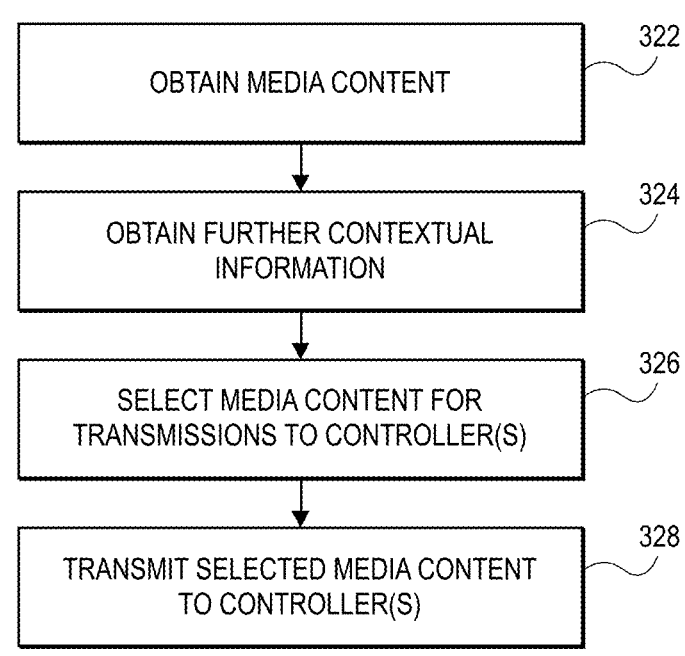
FIG. 3 depicts an example computer-implemented method associated with distribution of media content, in accordance with some embodiments.
Figure 4:
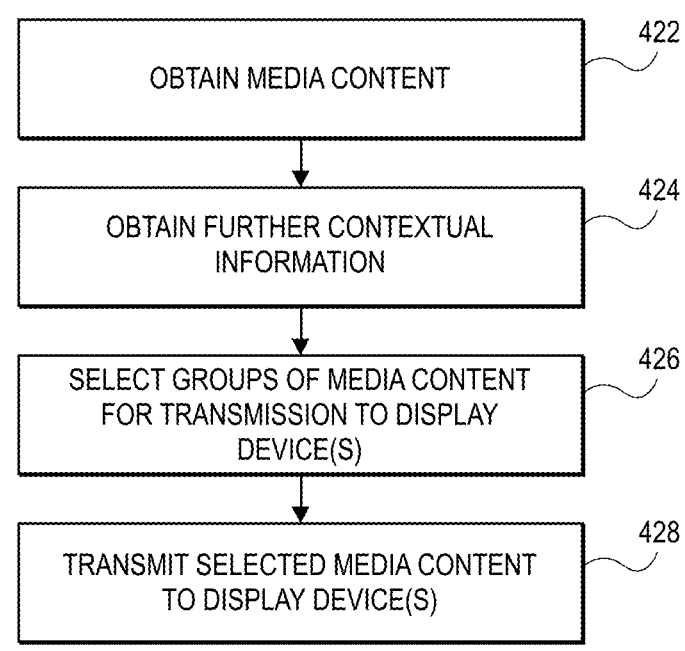
FIG. 4 depicts another example computer-implemented method associated with distribution of media content, in accordance with some embodiments.

FIGS. 3 and 4 depict example computer-implemented methods generally associated with media content distribution via the media content distribution platform described herein. In various embodiments, actions of the methods depicted in FIGS. 3 and 4 may be implemented via computing entities of the computing environment as depicted in FIGS. 1 and 2A-2C, and/or via other computing entities. In particular, in various embodiments, actions of the depicted methods may be performed upon execution of non-transitory computer-executable instructions via one or more computer processors. In some embodiments, the non-transitory computer-executable instructions may be provided via one or non-transitory computer-readable media.

Actions of the methods depicted in FIGS. 3 and 4 should not be interpreted as exclusive. Each of the depicted methods may include additional, fewer, and/or alternate actions, including actions described in this detailed description. In particular, each of the depicted methods may share actions depicted in other of the methods in this detailed description.

Order of actions of the methods depicted in FIGS. 3 and 4 may vary, in some embodiments. Where a retail environment is described, it should be understood that other fields of implementation may be envisioned.

Where actions throughout this detailed description and in the claims are described as being performed "via one or more processors" or the like, it should be understood that, in some embodiments, the one or more processors may be distributed among a plurality of computing entities. For example, "one or more processors" may refer to respective processors at a number of servers/controllers performing actions described herein. As another example, "one or more processors" may refer to one or more processors at a server/controller in combination with one or more processors of a display device and/or one or more processors of a user device.

Referring to FIG. 3, a computer-implemented method 300 for distributing media content is provided. The method 300 may, for example, distribute media content from a central server to one or more controllers associated with respective retail environments.

The method 300 may include obtaining media content (322, e.g., a plurality of media content offerings). The media content may be obtained, for example, at a central server tasked with storage and distribution of media content, such as video, audio, etc., across a number of retail environments and computing devices associated therewith. In some embodiments, the media content may be obtained automatically and/or periodically via one or more social media services (e.g., YouTube, Facebook, Instagram, etc.). More particularly, the media content may include content authored and/or owned by particular social media content creators/owners consenting for distribution of their media content via the techniques described herein.

The obtained media content may include media metadata describing each individual media content offering. In some embodiments, the obtained media content may itself include original metadata (e.g., metadata automatically generated upon upload to YouTube or other social media services). In some embodiments, obtaining the media content may include further analyzing the media content to include one or more further metadata parameter values (e.g., video timestamps associated with particular retail products, topics, etc. for particular use in the scenarios described herein).

The method 300 may include obtaining further contextual information associated with provision of the obtained media content (324). Such contextual information may include, for example (1) information describing controllers, display devices, and/or user devices via which the media content is to be provided, (2) information indicating locations of retail products in retail environments in which the media content is to be provided, (3) consumer purchase records and/or product preference records, (4) retail pricing or promotion information, and/or various other suitable information described herein.

The method 300 may include selecting, from the obtained media content, particular media content offerings for transmission to each of one or more controllers (326), which each may be associated with a physical environment (e.g., retail space) in which the media content is to be provided to consumers. Selection of media content for transmission may generally be based on comparison of media metadata to the obtained contextual information. In some embodiments, selection of media content may be based on minima or maxima amounts of certain types of count to be provided to particular computing devices (e.g., minimum or maximum of content directed to a same product, originating from a same author/owner, relating to a particular topic, or otherwise showing "sameness" as indicated by comparison of media metadata).

The method 300 may include transmitting the selected media content (e.g., selected subsets of media content offerings) to each of one or more controllers associated with the respective physical environments in which the media content is to be displayed (328). Transmitting the media content may include transmitting some or all corresponding metadata, in various embodiments. In some embodiments, transmitting the media content may include transmitting a "time-to-live" value, the expiration of which causes the one or more receiving controllers to delete the received data, so as to more effectively manage memory at each of the controllers.

Now referring to FIG. 4, another computer-implemented method 400 for distributing media content is provided. The method 400 may, for example, distribute media content from a retail controller to one or more display devices located within a retail environment.

The method 400 may include obtaining media content (422, e.g., a plurality of media content offerings). The media content may be received, for example, at a retail controller associated with a particular retail environment. In various embodiments, the obtaining of the media content may be based on information associated with the retail environment, products, consumers, and/or other information described herein. In some embodiments, the media content may be requested obtained automatically and/or periodically by the retail controller, the requests including information associated with the retail environment, display devices, products, consumers, and/or other information described herein.

The method 400 may include obtaining further contextual information associated with the retail environment (424). For, example, information may be obtained that indicates (1) locations of a plurality of display devices in the retail environment, (2) computing capabilities of the plurality of display devices, (3) locations of products near each of the plurality of display devices, (4) sales or promotions associated with products, (5) consumer purchase or preference records associated with the retail environment, and/or other information described herein.

The method 400 may include selecting groups of media content for transmission to display devices (426, e.g., selection of one or more media content offerings for transmission to each of one or more display devices). Generally, the selecting of groups of media content may be based on a comparison of media metadata to further contextual information (e.g., as described above) to identify relevant media content for transmission to the display devices. The selected groups of media content may, for example, include media content corresponding to retail products offered near each respective one of the plurality of display devices, such that selected media content is relevant to consumers upon display in particular areas of the retail environment.

In some embodiments, selection of media content may be based on minimum or maximum amounts of certain types of count to be provided to particular display devices (e.g., minimum or maximum amounts of content directed to a same product, originating from a same author/owner, relating to a particular topic, or otherwise showing "sameness" as indicated by comparison of media metadata).

The method 400 may include transmitting the selected media content (e.g., the respective groups of media content offerings) to each of the respective display devices (428). Transmitting the media content may include transmitting some or all corresponding metadata, in various embodiments. In some embodiments, transmitting the media content may include transmitting a "time-to-live" value, the expiration of which causes the receiving display devices to delete the received data from local storage.

VII. EXAMPLE COMPUTER-IMPLEMENTED DISPLAY/FEEDBACK METHODS

Figure 5:
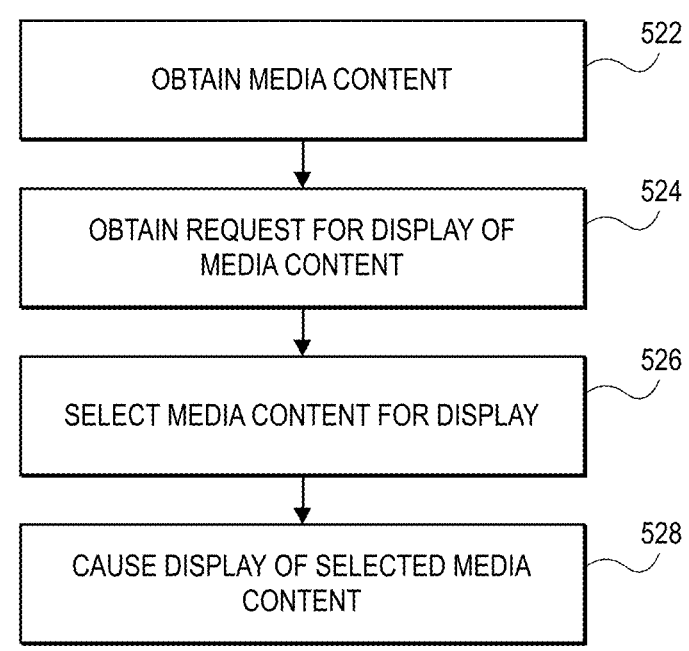
FIG. 5 depicts an example computer-implemented method associated with display of media content, in accordance with some embodiments.
Figure 6:
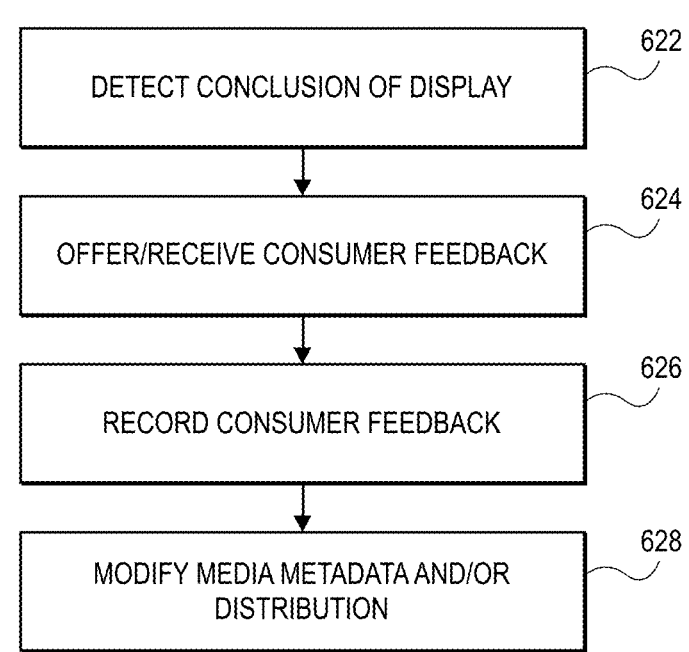
FIG. 6 depicts an example computer-implemented method associated with obtaining and processing consumer feedback, in accordance with some embodiments.

FIGS. 5 and 6 depict example computer-implemented methods generally associated with media display/feedback via the media content distribution platform described herein. In various embodiments, actions of the methods depicted in FIGS. 5 and 6 may be implemented via computing entities of the computing environment as depicted in FIGS. 1 and 2A-2C, and/or via other computing entities. In particular, in various embodiments, actions of the depicted methods may be performed upon execution of non-transitory computer-executable instructions via one or more computer processors. In some embodiments, the non-transitory computer-executable instructions may be provided via one or non-transitory computer-readable media.

Actions of the methods depicted in FIGS. 5 and 6 should not be interpreted as exclusive. Each of the depicted methods may include additional, fewer, and/or alternate actions, including actions described in this detailed description. In particular, each of the depicted methods may share actions depicted in other of the methods in this detailed description. Order of actions of the methods depicted in FIGS. 5 and 6 may vary, in some embodiments. Where a retail environment is described, it should be understood that other fields of implementation may be envisioned.

Referring to FIG. 5, a computer-implemented method 500 for displaying media content is provided. The method 500 may, for example, display a media content offering to a consumer in a retail environment via a retail display device and/or a user device (e.g., smartphone) carried by the consumer in the retail environment.

The method 500 may include obtaining media content at a display device (522), for example at a retail display device, which may be mounted to a retail display shelf or otherwise located near retail products in a retail environment, in various embodiments. The display device may, for example, receive the media content from a retail controller tasked with distributing media content across computing devices in the retail environment. Obtaining the media content may include obtaining the media metadata corresponding to the media itself.

The method 500 may include obtaining an indication of a request for display of media content (524). A request for media content may, for example, be provided via a consumer interaction with a user interface of a display device (e.g., an interface 260 as depicted in FIG. 2B). In some embodiments, the request for media content may be provided via a user device of the consumer. In still some embodiments, obtaining the indication of the request for media content may include a determination that a consumer has been standing at or near the display device for at least a predetermined amount of time (e.g., 30 seconds or 60 seconds), upon which a determination is made to select and display media content.

The method 500 may include selecting a particular media content offering for display in response to the request for media content (526). The selection may generally be a selection from media content offerings available at the display device (e.g., previously obtained and stored by the display device). The selection may generally be based on a comparison of the request (e.g., a general request for media content, or a request for a particular topic or product indicated by a consumer) to metadata corresponding to the available media content offerings. In various embodiments, a media content offering most closely matching the request may be provided. In contexts in which the request for media content is a general request for media content, the selection may be based on an identification of a media content offering relating to one or more promoted products, or authored/owned by a promoted content creator. In some embodiments, the selection of the media content offering may be based at least in part on consumer purchase or preference records (e.g., records particular to one consumer, one retail environment, or aggregated across multiple consumers and/or retail environments). Furthermore, in some embodiments, the selection of the particular media content offering may be a selection of a particular portion thereof (e.g., a particular 1-minute portion of a 5-minute video).

In some embodiments, selecting the particular media content offering may include determining an ambient noise level of the physical environment surrounding the display (e.g., as detected by the display device or another microphone). If the determined noise level exceeds a predetermined threshold, a media content offering may be selected that does not include audio, or that is not reliant on audio such that the media content offering may be displayed with reduced volume or no audio.

The method 500 may include causing the selected media content offering to be displayed at the display device (528). In some embodiments, causing the selected media content to be displayed may include causing deactivation of display of media content at one or more other nearby display devices.

Now referring to FIG. 6, a computer-implemented method 600 for receiving and handling consumer feedback is provided. The method 600 may, for example, receive consumer feedback at a retail display device following conclusion of a display of a media content offering at the retail display device.

The method 600 may include detecting conclusion of a display of a media content offering at a display device (622). The conclusion of the display may, for example, correspond to the ending of a video or a selected portion thereof. Additionally or alternatively, the conclusion of the display may be based on a command from a consumer to stop display of media content. In some embodiments, upon conclusion of the display, the display device may record display metrics associated with the displayed media content (e.g., indicating that the media content was displayed, or more specifically indicating total display time). Such display metrics may be used, for example, to identify popular media content and/or to issue compensation or charges to media content authors/owners.

The method 600 may include offering and/or receiving consumer feedback regarding the displayed media content (624). The offering/receiving of feedback may be implemented via a user interface at the display device (e.g., the interface 260 as depicted in FIG. 2C). Accordingly, the receiving of user feedback may indicate, for example, consumer satisfaction with the displayed media content itself, and/or relevance of the media content to the consumer's need.

The method 600 may include recording the consumer feedback (626). Recording the consumer feedback may include logging user feedback at the display device, and/or transmitting the consumer feedback to one or more controllers or servers.

The method 600 may include modifying/updating media metadata and/or distribution based on the display and the received information (628). In some embodiments, for example, media metadata corresponding to the displayed media content offering may be automatically updated to reflect the consumer feedback regarding the media content offering. In some embodiments, weighting of future distribution of media content may be based on the modifying/updating of media metadata. For example, when one video from one content author is well-reviewed, positive weighting may be applied to other videos by that author such that those videos are subsequently more likely to be distributed among controllers and display devices.

VIII. EXAMPLE SERVER/CONTROLLER DEVICE

Figure 7:
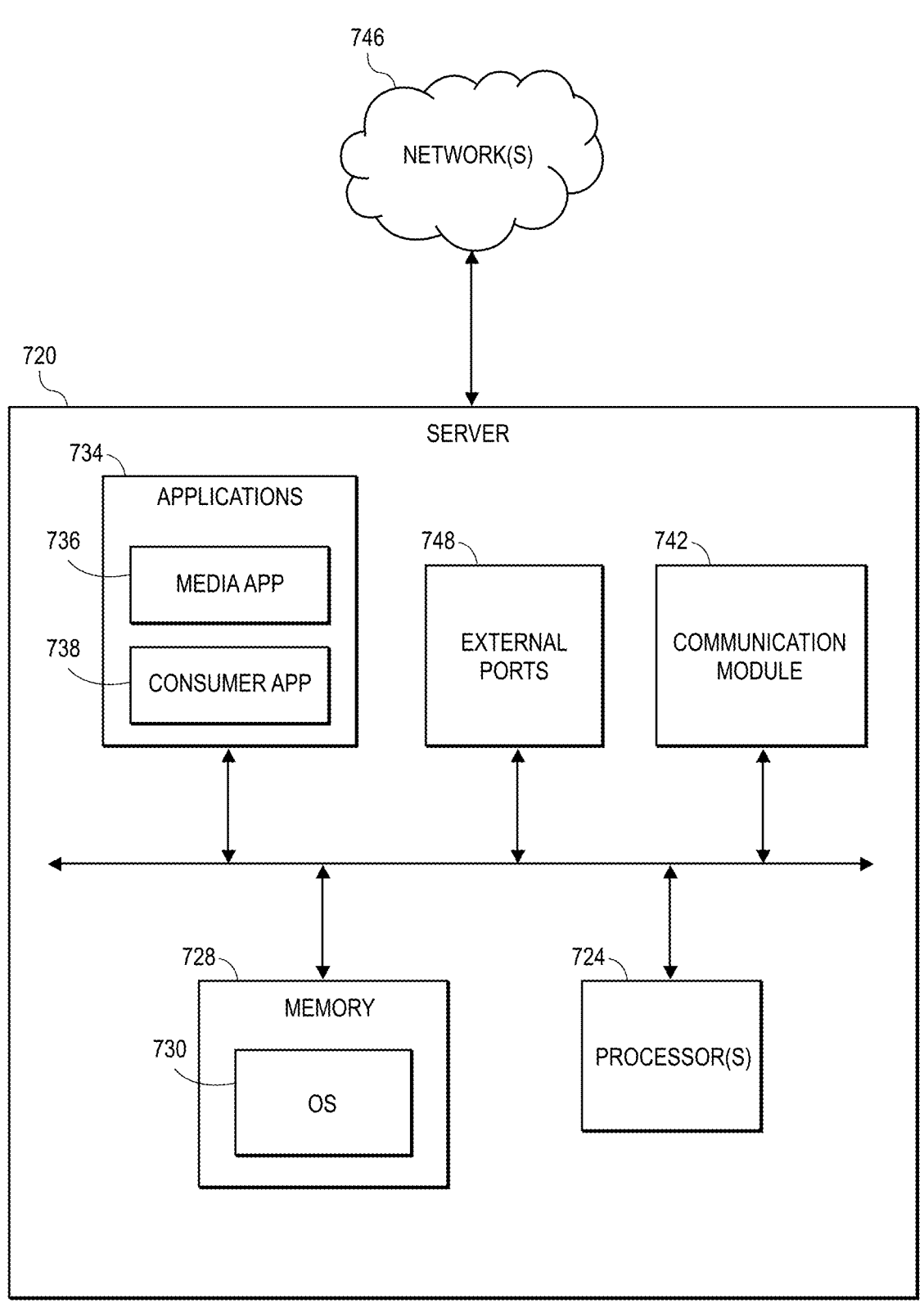
FIG. 7 depicts a diagram of an example server or controller device, in accordance with some embodiments.

FIG. 7 depicts a diagram of an example server 720 (i.e., one or more servers) in which at least some of the server and/or controller functionalities as discussed herein. The server 720 may, for example, implement at least some of the functionalities of the central server 102 and/or of one or more retail controllers 124 as discussed with respect to FIG. 1. Accordingly, in some embodiments, the server 720 may be implemented at least partially in a retail environment such as a pharmacy, general store, etc.

The server 720 may include one or more processors 724 as well as a memory 728 (i.e., one or more computer memories). The memory 728 may store an operating system 730 capable of facilitating the described functionalities of the server 720. The memory 728 may store one or more databases (e.g., one or more relational databases) that may store media content as described herein (e.g., videos and other media including metadata). The memory 728 may store various other information described herein, including but not limited to retail product/aisle arrangements, retail purchase records, consumer preference data, media display metrics, and/or metadata regarding other servers or display devices.

The server 720 may store a set of applications 734 (e.g., non-transitory computer-executable instructions). The one or more applications may include, for example, a media content distribution application 736 ("Media App") and/or a consumer application 738 ("Consumer App"). The media application 736 may be configured, for example, to obtain media content (e.g., via social media services and/or other databases), manage media metadata, store media content, and/or distribute media content using the techniques described herein (e.g., distribution among a central server, retail controllers, and/or retail displays). The consumer application 738 may be configured, for example, to allow consumers at respective user devices to explore retail products, electronically purchase retail products, and/or indicate consumer preferences regarding the types of retail products that the user is interesting in purchasing. Other applications may be envisioned.

The one or more processors 724 may interface with the memory 728 to execute the operating system 730 and the set of applications 734. The memory 728 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The server 720 may further include a communication module 742 configured to communicate data via one or more networks 746 (e.g., any suitable network(s) 128 described with respect to FIG. 1). In some embodiments, the communication module 742 may include one or more transceivers (e.g., WWAN, WLAN, and/or WPAN transceivers) functioning in accordance with IEEE standards, 3GPP standards, or other standards, and configured to receive and transmit data via one or more external ports 748. For example, the communication module 742 may (1) transmit and/or receive, via the one or more networks 746, media content and/or a requests for media content (e.g., comprising media metadata parameter values). As another example, the communication module 742 may transmit and/or receive retail product location data, media display metrics, etc.

In general, a computer program product in accordance with an embodiment may include a computer usable storage medium (e.g., standard random access memory (RAM), an optical disc, a universal serial bus (USB) drive, or the like) having computer-readable program code embodied therein, wherein the computer-readable program code is adapted to be executed by the one or more processors 724 (e.g., working in connection with the operating system 730) to facilitate the functions as described herein. In this regard, the program code may be implemented in any desired language, and may be implemented as machine code, assembly code, byte code, interpretable source code or the like (e.g., via Python, or other languages, such as C, C++, Java, Actionscript, Objective-C, JavaScript, CSS, XML). In some embodiments, the computer program product may be part of a cloud network of resources.

IX. EXAMPLE DISPLAY DEVICE

Figure 8:
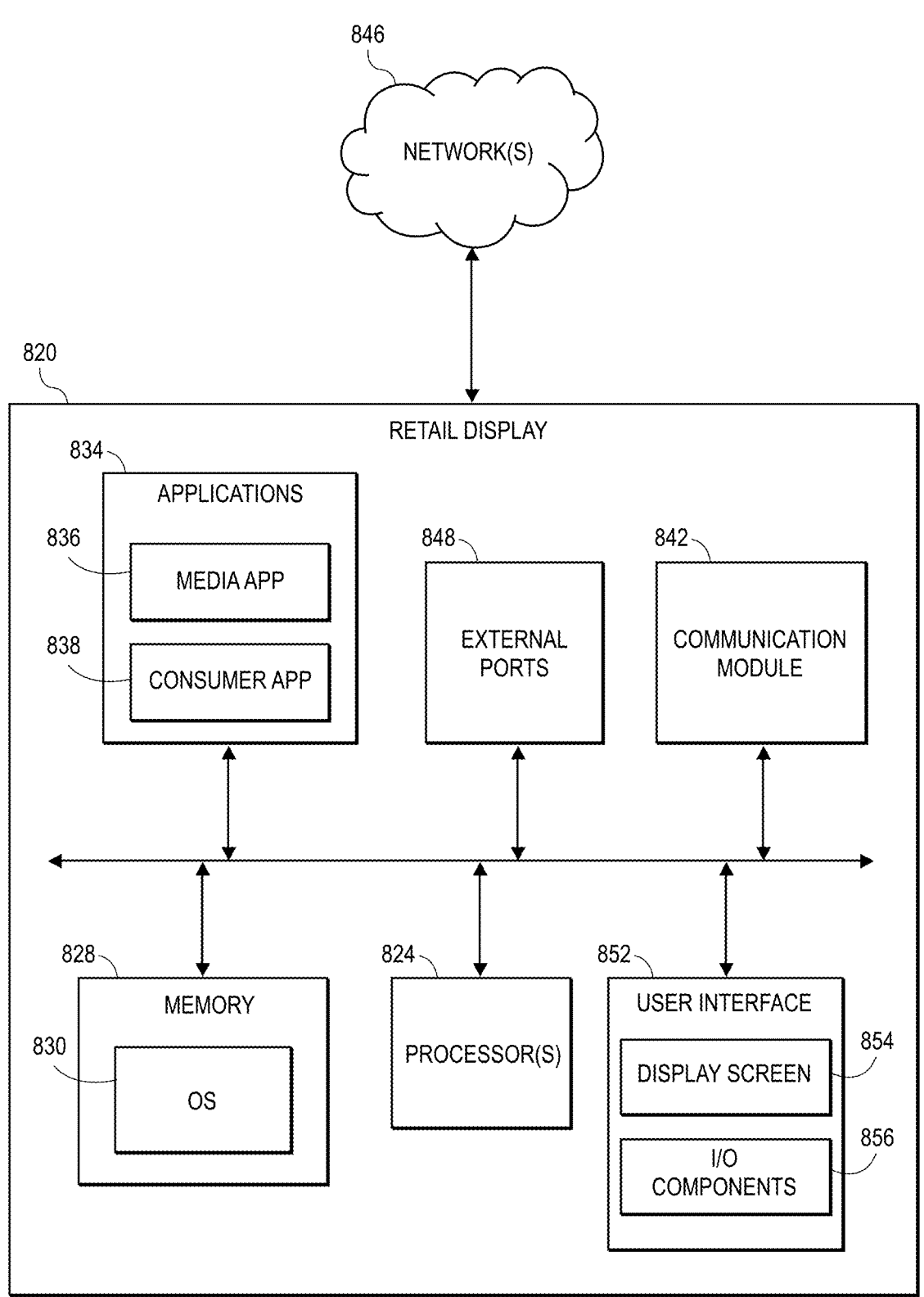
FIG. 8 depicts a diagram of an example display device, in accordance with some embodiments.

FIG. 8 depicts a diagram of an example display device 820 in which at least some of the functionalities discussed herein may be implemented, for example to receive and display media content to consumers in retail environments. The display device 820 may, for example, implement the functionalities of a retail display device 134 discussed with respect to FIGS. 1 and 2A-2C.

The display device 820 may include one or more processors 824 as well as a memory 828 (i.e., one or more memories). The one or more processors 824 may include one or more CPUs, GPUs, and/or other processing units. The memory 828 may store an operating system 830 capable of facilitating the functionalities as described herein. The memory 828 may store media content including media metadata, for example via one or more databases. The memory 828 may store various other information described herein, including but not limited to retail product arrangements (e.g., particular to the retail environment in which the display device 820 may be situated), retail purchase records, consumer preference data, media display metrics, and/or metadata regarding other servers or display devices.

The display device 820 may store a set of applications 834 (e.g., non-transitory computer-executable instructions). The one or more applications may include, for example, a media content distribution application 836 ("Media App") and/or a consumer application 838 ("Consumer App"), either or both of which may implement similar functionalities to the server applications 736 and 738, respectively. The media application 836 may be configured, for example, to obtain media content at the display device 820 from a retail controller that is tasked with distributing media content in the particular retail environment in which the display device 820 is provided. The consumer application 838 may be configured, for example, to allow consumers at the display device 820 to explore retail products, electronically purchase retail products, and/or indicate consumer preferences regarding the types of retail products that the user is interesting in purchasing. In some embodiments, the consumer application

838 may be configured to interface with the consumer application 738 and/or a consumer application at a user device of a consumer. Other applications may be envisioned, in some embodiments.

The one or more processors 824 may interface with the memory 828 to execute the operating system 830 and the set of applications 834. The memory 828 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The display device 820 may further include a communication module 842 configured to communicate data via one or more networks 846 (e.g., any suitable network(s) described with respect to FIG. 1). In some embodiments, the communication module 842 may include one or more transceivers (e.g., WWAN, WLAN, and/or WPAN transceivers) functioning in accordance with IEEE standards, 3GPP standards, or other standards, and configured to receive and transmit data via one or more external ports 848. For example, the communication module 842 may (1) transmit and/or receive, via the one or more networks 846, media content and/or a requests for media content (e.g., comprising media metadata parameter values). As another example, the communication module 842 may transmit and/or receive retail product arrangement data, media display metrics, etc. As yet another example, in some embodiments, the communication module 842 may transmit and/or receive information to and/or from other display devices in the same retail environment, for example to stop media playback at another nearby display device.

The display device 820 may include a user interface 852 configured to present media content and/or other information to a consumer, and/or receive inputs from a consumer. The user interface 852 may particularly include a display screen 854, and/or other I/O components 856 (e.g., ports, a touchscreen, keys, buttons, lights, LEDs, speakers, and/or microphones). The user interface 852 may, for example display media content (e.g., videos with or without audio) via the various techniques described herein, and may receive consumer feedback upon completion of a display of the media content.

In general, a computer program product in accordance with an embodiment may include a computer usable storage medium (e.g., standard random access memory (RAM), an optical disc, a universal serial bus (USB) drive, or the like) having computer-readable program code embodied therein, wherein the computer-readable program code is adapted to be executed by the one or more processors 824 (e.g., working in connection with the operating system 830) to facilitate the functions as described herein. In this regard, the program code may be implemented in any desired language, and may be implemented as machine code, assembly code, byte code, interpretable source code or the like (e.g., via Python, or other languages, such as C, C++, Java, Actionscript, Objective-C, JavaScript, CSS, XML). In some embodiments, the computer program product may be part of a cloud network of resources.

X. EXAMPLE USER DEVICE

Figure 9:
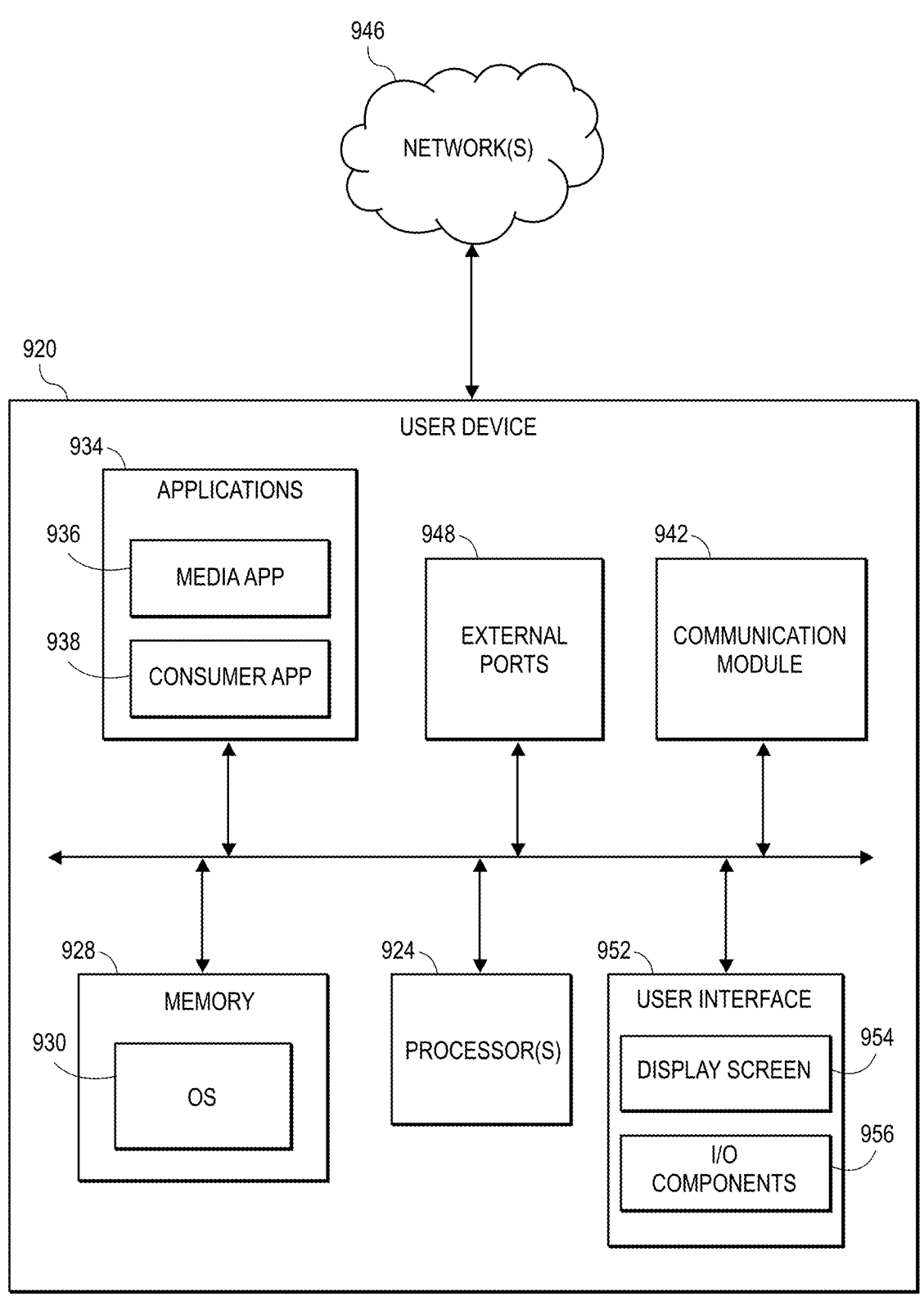
FIG. 9 depicts a diagram of an example user electronic device, in accordance with some embodiments.

FIG. 9 depicts a diagram of an example user electronic device 920 ("user device") by which at least some of the functionalities discussed herein may be implemented. The user device 920 may generally be a personal electronic device, such as a smartphone or tablet, used by a consumer in a retail environment. The user device 920 may, for example, implement the functionalities of the user device 138 discussed with respect to FIGS. 1 and 2A-2C.

The user device 920 may include one or more processors 924 as well as a memory 928 (i.e., one or more memories). The one or more processors 924 may include one or more CPUs, GPUs, and/or other processing units. The memory 928 may store an operating system 930 capable of facilitating the functionalities as described herein. The memory 928 may store various information described herein, such as retail purchase records and/or consumer preference data corresponding to the consumer using the user device 920.

The user device 920 may store a set of applications 934 (e.g., non-transitory computer-executable instructions). The one or more applications may include, for example, a media content distribution application 936 ("Media App") and/or a consumer application 938 ("Consumer App"), either or both of which may implement similar functionalities to the server applications 736/836 and 738/838, respectively. In some embodiments, for example, the media application 936 may be configured to download and/or stream media content simultaneously to display of media content at a display device (e.g., retail display device 134). The consumer application 938 may be configured, for example, to allow a consumer to explore retail products, electronically purchase retail products, and/or indicate consumer preferences regarding the types of retail products that the user is interesting in purchasing (e.g., based on allergies, skin type, and/or other characteristics particular to the consumer). In some embodiments, the consumer application 938 may be configured to interface with the consumer application 838/738 to synchronize similar functions to be performed via a display device. Other applications may be envisioned, in some embodiments.

The one or more processors 924 may interface with the memory 928 to execute the operating system 930 and the set of applications 934. The memory 928 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The user device 920 may further include a communication module 942 configured to communicate data via one or more networks 946 (e.g., any suitable network(s) described with respect to FIG. 1). In some embodiments, the communication module 942 may include one or more transceivers (e.g., WWAN, WLAN, and/or WPAN transceivers) functioning in accordance with IEEE standards, 3GPP standards, or other standards, and configured to receive and transmit data via one or more external ports 948. For example, the communication module 942 may (1) transmit and/or receive, via the one or more networks 946, media content, requests for media content, and/or consumer-specific information (e.g., product preferences).

The user device 920 may include a user interface 952 configured to present media content and/or other information to a consumer, and/or receive inputs from a consumer. The user interface 952 may particularly include a display screen 954, and/or other I/O components 956 (e.g., ports, a touchscreen, keys, buttons, lights, LEDs, speakers, and/or microphones). The user interface 952 may, for example display media content, and/or receive consumer feedback according to the techniques described herein.

In general, a computer program product in accordance with an embodiment may include a computer usable storage medium (e.g., standard random access memory (RAM), an optical disc, a universal serial bus (USB) drive, or the like) having computer-readable program code embodied therein, wherein the computer-readable program code is adapted to be executed by the one or more processors 924 (e.g., working in connection with the operating system 930) to facilitate the functions as described herein. In this regard, the program code may be implemented in any desired language, and may be implemented as machine code, assembly code, byte code, interpretable source code or the like (e.g., via Python, or other languages, such as C, C++, Java, Action-script, Objective-C, JavaScript, CSS, XML). In some embodiments, the computer program product may be part of a cloud network of resources.

XI. ADDITIONAL CONSIDERATIONS

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and retail the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

What is claimed:

1. A computing system comprising:

one or more processors; and one or more memories storing non-transitory computer-executable instructions that, when executed via the one or more processors, cause the computing system to:

obtain media metadata defining a plurality of media content offerings, the metadata respectively defining each respective media content offering from among the plurality of media content offerings to be associated with at least one product;

obtain location information for a plurality of locations, the location information for each respective location from among the plurality of locations indicating (i) a plurality of products located in the respective location, and (ii) respective locations and storage capacities of one or more display devices located in the respective location;

obtain an indication of a minimum or maximum content limit defining a minimum or maximum number of media content offerings or a minimum or maximum total size of media content offerings having a same metadata parameter value, the same metadata parameter value being one of (i) an associated product, (ii) a topic, (iii) a content author, (iv) a content owner, or (v) a language;

for each respective location, select, from the plurality of media content offerings based upon the minimum or maximum content limit and the media metadata, a respective subset of the plurality of media content offerings, such that the selected respective subset of media content offerings satisfies the minimum or maximum content limit with respect to each respective location; and for each respective location, cause the selected respective subset of media content offerings to be transmitted to at least one computing device associated with the respective location.

2. The computing system of claim 1, wherein the same metadata parameter value is the associated product.

3. The computing system of claim 1, wherein the same metadata parameter value is the topic.

4. The computing system of claim 1, wherein the same metadata parameter value is the content author.

5. The computing system of claim 1, wherein the same metadata parameter value is the content owner.

6. The computing system of claim 1, wherein the same metadata parameter value is the language.

7. The computing system of claim 1, wherein each respective location from among the plurality of locations is a respective retail store, and wherein, for each respective location from among the plurality of locations, the at least one computing device includes a respective retail controller device.

8. The computing system of claim 1, wherein the plurality of locations correspond to a single retail store, each respective location from among the plurality of locations being a respective portion of the single retail store, and wherein, for each respective location from among the plurality of locations, the respective at least one computing device comprises one or more display devices located in the respective portion of the single retail store.

9. A computer-implemented method performed via one or more processors, the method comprising:

obtaining media metadata defining a plurality of media content offerings, the metadata respectively defining each respective media content offering from among the plurality of media content offerings to be associated with at least one product;

obtaining location information for a plurality of locations, the location information for each respective location from among the plurality of locations indicating (i) a plurality of products located in the respective location, and (ii) respective locations and storage capacities of one or more display devices located in the respective location;

obtaining an indication of a minimum or maximum content limit defining a minimum or maximum number of media content offerings or a minimum or maximum total size of media content offerings having a same metadata parameter value, the same metadata parameter value being one of (i) an associated product, (ii) a topic, (iii) a content author, (iv) a content owner, or (v) a language;

for each respective location, selecting, from the plurality of media content offerings based upon the minimum or maximum content limit and the media metadata, a respective subset of the plurality of media content offerings, such that the selected respective subset of media content offerings satisfies the minimum or maximum content limit with respect to each respective location; and for each respective location, causing the selected respective subset of media content offerings to be transmitted to at least one computing device associated with the respective location.

10. The computer-implemented method of claim 9, wherein the same metadata parameter value is the associated product.

11. The computer-implemented method of claim 9, wherein the same metadata parameter value is the topic.

12. The computer-implemented method of claim 9, wherein the same metadata parameter value is the content author.

13. The computer-implemented method of claim 9, wherein the same metadata parameter value is the content owner.

14. The computer-implemented method of claim 9, wherein the same metadata parameter value is the language.

15. The computer-implemented method of claim 9, wherein each respective location from among the plurality of locations is a respective retail store, and wherein, for each respective location from among the plurality of locations, the at least one computing device includes a respective retail controller device.

16. The computer-implemented method of claim 9, wherein the plurality of locations correspond to a single retail store, each respective location from among the plurality of locations being a respective portion of the single retail store, and wherein, for each respective location from among the plurality of locations, the respective at least one computing device comprises one or more display devices located in the respective portion of the single retail store.

17. One or more computer readable media comprising non-transitory instructions that, when executed via one or more processors, cause one or more computers to:

obtain media metadata defining a plurality of media content offerings, the metadata respectively defining each respective media content offering from among the plurality of media content offerings to be associated with at least one product;

obtain location information for a plurality of locations, the location information for each respective location from among the plurality of locations indicating (i) a plurality of products located in the respective location, and (ii) respective locations and storage capacities of one or more display devices located in the respective location;

obtain an indication of a minimum or maximum content limit defining a minimum or maximum number of media content offerings or a minimum or maximum total size of media content offerings having a same metadata parameter value, the same metadata parameter value being one of (i) an associated product, (ii) a topic, (iii) a content author, (iv) a content owner, or (v) a language;

for each respective location, select, from the plurality of media content offerings based upon the minimum or maximum content limit and the media metadata, a respective subset of the plurality of media content offerings, such that the selected respective subset of media content offerings satisfies the minimum or maximum content limit with respect to each respective location; and for each respective location, cause the selected respective subset of media content offerings to be transmitted to at least one computing device associated with the respective location.

18. The one or more computer readable media of claim 17, wherein the same metadata parameter value is the associated product.

19. The one or more computer readable media of claim 17, wherein the same metadata parameter value is the topic.

20. The one or more computer readable media of claim 17, wherein the same metadata parameter value is the content author.

21. The one or more computer readable media of claim 17, wherein the same metadata parameter value is the content owner.

22. The one or more computer readable media of claim 17, wherein the same metadata parameter value is the language.

23. The one or more computer readable media of claim 17, wherein each respective location from among the plurality of locations is a respective retail store, and wherein, for each respective location from among the plurality of locations, the at least one computing device includes a respective retail controller device.

24. The one or more computer readable media of claim 17, wherein the plurality of locations correspond to a single retail store, each respective location from among the plurality of locations being a respective portion of the single retail store, and wherein, for each respective location from among the plurality of locations, the respective at least one computing device comprises one or more display devices located in the respective portion of the single retail store.

* * * * *